US006834834B2

(12) United States Patent
Dazet et al.

(10) Patent No.: US 6,834,834 B2
(45) Date of Patent: Dec. 28, 2004

(54) ARTICULATION DEVICE FOR AN AIRCRAFT DOOR PANEL AND AN AIRCRAFT DOOR INTEGRATING SUCH A DEVICE

(75) Inventors: Francis Dazet, St. Alban (FR); François Rouyre, Cornebarrieu (FR)

(73) Assignee: Airbus France (FR)

( * ) Notice: Subject to any disclaimer, the term of this patent is extended or adjusted under 35 U.S.C. 154(b) by 136 days.

(21) Appl. No.: 10/050,916

(22) Filed: Jan. 22, 2002

(65) Prior Publication Data

US 2002/0096602 A1 Jul. 25, 2002

(30) Foreign Application Priority Data

Jan. 25, 2001 (FR) .......................................... 01 01000

(51) Int. Cl.[7] .............................................. B64C 1/14
(52) U.S. Cl. ........................... 244/129.5; 244/129.4; 49/246; 49/247; 49/345; 16/368
(58) Field of Search .......................... 244/129.4, 129.5, 244/129.6; 16/368; 49/246, 247, 249, 345; 52/19

(56) References Cited

U.S. PATENT DOCUMENTS

| 2,564,988 | A | * | 8/1951 | Muller ..................... 244/129.5 |
| 2,751,636 | A | * | 5/1956 | Heinemann et al. ..... 244/129.5 |
| 2,931,599 | A | * | 4/1960 | McQuilkin ............... 244/129.6 |
| 3,051,280 | A | * | 8/1962 | Bergman et al. ............... 49/249 |
| 3,085,297 | A | * | 4/1963 | Linderfelt ................ 244/129.5 |
| 3,213,962 | A | * | 10/1965 | Clark ........................... 49/249 |
| 4,199,120 | A | * | 4/1980 | Bergman et al. .......... 244/129.5 |
| 4,854,010 | A | * | 8/1989 | Maraghe et al. ............... 16/368 |
| 5,180,121 | A | * | 1/1993 | Banks et al. .............. 244/129.5 |
| 5,289,615 | A | * | 3/1994 | Banks et al. .............. 244/129.5 |
| 5,305,969 | A | * | 4/1994 | Odell et al. ............... 244/129.5 |
| 5,667,169 | A | * | 9/1997 | Erben et al. .............. 244/129.5 |
| 6,547,186 | B2 | * | 4/2003 | Senger ..................... 244/129.5 |
| 6,568,637 | B2 | * | 5/2003 | Bluem et al. ............. 244/129.5 |

FOREIGN PATENT DOCUMENTS

| EP | 0267876 | * | 5/1988 | ............... 244/129.5 |
| EP | 0 317 037 | | 5/1989 | |
| EP | 0512588 A1 | * | 11/1992 | ............... 244/129.5 |
| GB | 2111120 A1 | * | 6/1983 | ............... 244/129.5 |

* cited by examiner

Primary Examiner—Michael J. Carone
Assistant Examiner—L. Semunegus
(74) Attorney, Agent, or Firm—Thelen Reid & Priest LLP (57) ABSTRACT

Articulation device for an aircraft door panel and an aircraft door integrating such a device.

An aircraft door panel is articulated on the jamb by a device (20) that defines an approximately elliptical opening and closing trajectory, in which the major axis is approximately perpendicular to the panel. The device (20) comprises in particular a main arm (30), a secondary arm (32) articulated at the end of the main arm and a control lever (34) connecting the secondary arm (32) to the jamb, by articulation axes (A4, A5) close to the articulation axes of the main arm (30) on the jamb and the secondary arm (32) on the main arm. This arrangement makes it possible to fit a more voluminous emergency exit chute into the door panel.

11 Claims, 7 Drawing Sheets

ARTICULATION DEVICE FOR AN AIRCRAFT DOOR PANEL AND AN AIRCRAFT DOOR INTEGRATING SUCH A DEVICE

DESCRIPTION

1. Technical domain

The invention mainly relates to an articulation device for an aircraft door panel on a jamb of the said door. This device defines the trajectory followed by the door panel when it opens and closes. It also controls the orientation of the door, so that this orientation is approximately constant when the door is moved along the above mentioned trajectory.

Another purpose of the invention is an aircraft door, particularly comprising a panel and a jamb connected to each other by an articulation device of this type.

A door incorporating an articulation device according to the invention may be used on any type of aircraft. A preferred application is large carriers for passenger transport.

2. State of the art

Conventionally, an aircraft door comprises a jamb connected to the aircraft fuselage and delimiting an opening, usually rectangular, necessary in particular for passengers and the crew to enter and leave the aircraft. The door also comprises a panel connected to the jamb by an articulation device. This device defines the trajectory followed by the panel when it moves between an open state and a closed state. The articulation device also controls the orientation of the door such that this orientation remains unchanged when the door is moved between its open state and its closed state, or vice versa.

An aircraft door also includes locking means that the crew or airport personnel can handle manually to control locking or unlocking of the panel on the jamb, depending on the case.

An aircraft door also includes complementary stops forming part of the jamb and the door panel respectively. When the door is closed, the outside of the panel stops are forced into contact with the jamb stops. Pressurization inside the fuselage helps to maintain the pressure between the stops.

Therefore, before the panel is open following the trajectory defined by the articulation device, the door panel must be moved with respect to the jamb parallel to itself in order to move the panel stops away from the jamb stops. This movement is usually achieved by the use of means of locking the door along the direction in which it will be released. Normally, the door panel is then moved upwards following the curvature of the fuselage and its effect is to offset the stops formed on this panel with respect to the stops fixed on the jamb along the same direction.

As illustrated particularly in document U.S. Pat. No. 5,289,615, an articulation device for an aircraft door panel usually comprises a single arm with a crank towards the inside of the aircraft. This arm is articulated at its first end on the door jamb and at its opposite end on the door panel.

In document U.S. Pat. No. 5,289,615, the articulation device also comprises a door orientation system including a notched belt, a cable or an endless chain installed on the arm. More precisely, the notched belt, and the cable or the endless chain passes between the pulleys or toothed wheels installed on hinge pins centered on the articulation axes connecting the arm to the jamb and to the door panel respectively. Pulleys or guide rollers are also installed on the cranked part of the arm so that the notched belt, cable or endless chain can approximately follow the contours of the arm.

This system is completed by connecting rods that connect each of the hinge pins installed on the ends of the arm to the jamb and the door panel respectively.

In this type of aircraft door panel articulation device, the trajectory followed by the panel when it is opened or closed is circular. Consequently, whenever the door panel starts to move towards the outside of the fuselage, it also moves forwards or backwards parallel to itself, in a proportion that increases quickly as the door panel moves away.

On most aircraft, an emergency exit chute is provided in the folded state in a compartment provided for it in the bottom of the door panel on the inside of the aircraft. This compartment forms a projection, the dimensions and shape of which depend on the size of the chute and the need to prevent any interference between the door panel and the jamb when the door is opened and closed.

On a very large carrier such as an aircraft with two superposed decks, some doors have to be fitted with very long chutes. This is the case particularly for doors on the upper deck, for which the chutes have to be sufficiently long to allow for the height of the upper deck above the ground in the case of an accident. The volume occupied by this type of chute in the folded state makes it necessary to place compartments in the bottom of the corresponding doors that are sufficiently large so that it is almost impossible to install them on a door fitted with a traditional articulation device particularly like that illustrated in document U.S. Pat. No. 5,289,615. Regardless of the shape of the compartment, the circular trajectory imposed by the articulation device inevitably causes interference between the compartment fitted in the door panel and the door jamb during opening and closing operations.

Furthermore, due to the curvature of the aircraft fuselage at the upper deck of a very large carrier with two superposed decks, the upwards movement of the door panel that normally occurs along the curvature of the fuselage by the door locking means to move the door panel stops away from the door jamb stops before opening the door, imposes a relatively large rise distance for the door panel. This rise distance may be as much as approximately 70 mm. This can cause a number of problems that are not found in existing aircraft doors, in which this displacement is significantly smaller.

PRESENTATION OF THE INVENTION

The purpose of the invention is precisely an articulation device for an aircraft door panel with an innovative design that enables the said door panel to be opened and closed without any risk of interference with the door jamb even if the door panel has to carry a particularly large compartment used to house a chute, with very large dimensions in the folded state.

According to the invention, this result is achieved by means of an aircraft door panel articulation device on a jamb of the said door, the said device comprising a mechanism connecting the jamb to the panel to define a displacement trajectory of the said door panel outside the aircraft when it is opened and closed, and orientation means capable of maintaining an approximately constant orientation of the panel during its displacement along the said trajectory, characterized in that the said mechanism defines a trajectory with a variable curvature comprising mainly a first part with a relatively large radius of curvature approximately perpendicular to the panel including a closed state of the said panel, and a second part with a relatively small radius of curvature approximately parallel to the said panel, including a fully open state of the panel.

In a preferred embodiment of the invention, the mechanism connecting the jamb to the panel defines an approximately elliptical trajectory, in which the major axis is approximately perpendicular to the door panel.

Consequently, the mechanism advantageously comprises a main arm that may be articulated onto the jamb by a first axis, at least one secondary arm articulated on the main arm by a second axis and that may be articulated on the door panel by a third axis, and at least one control lever that may be articulated on the jamb by a fourth axis close to the first axis and articulated on the secondary arm by a fifth axis close to the second axis.

In this case, the fourth axis is preferably offset towards the outside of the aircraft from the first axis and the fifth axis is offset towards the outside of the aircraft and towards the first axis from the second axis.

Preferably, the offsets between the first and the fourth axes and between the second and the fifth axes are approximately equal.

Advantageously, the length of the control lever is then less than the length of the main arm by approximately the same distance as the offsets between the first and the fourth axes and between the second and the fifth axes.

In the preferred embodiment of the invention, the means of orientation of the door panel advantageously comprise at least one first connecting rod, one end of which is fixed to a first hinge pin on which the main arm is supported around the first axis, and the other end of which can be articulated onto the jamb, at least one second connecting rod one end of which is fixed to a second hinge pin installed and free to rotate on the secondary arm about the third axis and the other end of which can be articulated on the door panel, and synchronous connecting means inserted between the first hinge pin and the second hinge pin in order to keep the angular orientation of the second hinge pin constant.

In particular, the synchronous connecting means may include at least one first endless belt supported on the main arm and passing between the pulleys, one of which is connected to the first hinge pin and the other to a third hinge pin installed free to rotate about the second axis, and at least one second endless belt supported on the secondary arm and passing between the pulleys fixed in rotation to the third and second hinge pins respectively.

To facilitate the door opening movement, the main arm is usually cranked towards the inside of the aircraft. It then advantageously supports a fourth hinge pin rotating on the cranked part. In this case, at least two first endless belts pass between the pulleys supported on the first and fourth hinge pins, and between the pulleys supported on the fourth and third hinge pins.

Another purpose of the invention is an aircraft door comprising a jamb connected to the aircraft fuselage and a door panel articulated on the jamb by an articulation device like that defined above.

Normally, the door panel and the jamb comprise complementary stops that come into mutual contact when the door panel is in its closed state. Furthermore, the door comprises locking means that lock and release the door. These locking means are advantageously capable of controlling a downwards movement of the panel to move the panel stops downwards with respect to the jamb stops when the locking means are released before the door panel is opened along the above mentioned trajectory, and vice versa, in order to reduce displacements and simplify the mechanisms.

BRIEF DESCRIPTION OF THE DRAWINGS

We will now describe a preferred embodiment of the invention as a non-restrictive example with reference to the attached drawings in which.

DETAILED DESCRIPTION OF A PREFERRED EMBODIMENT OF THE INVENTION

Figure 1:
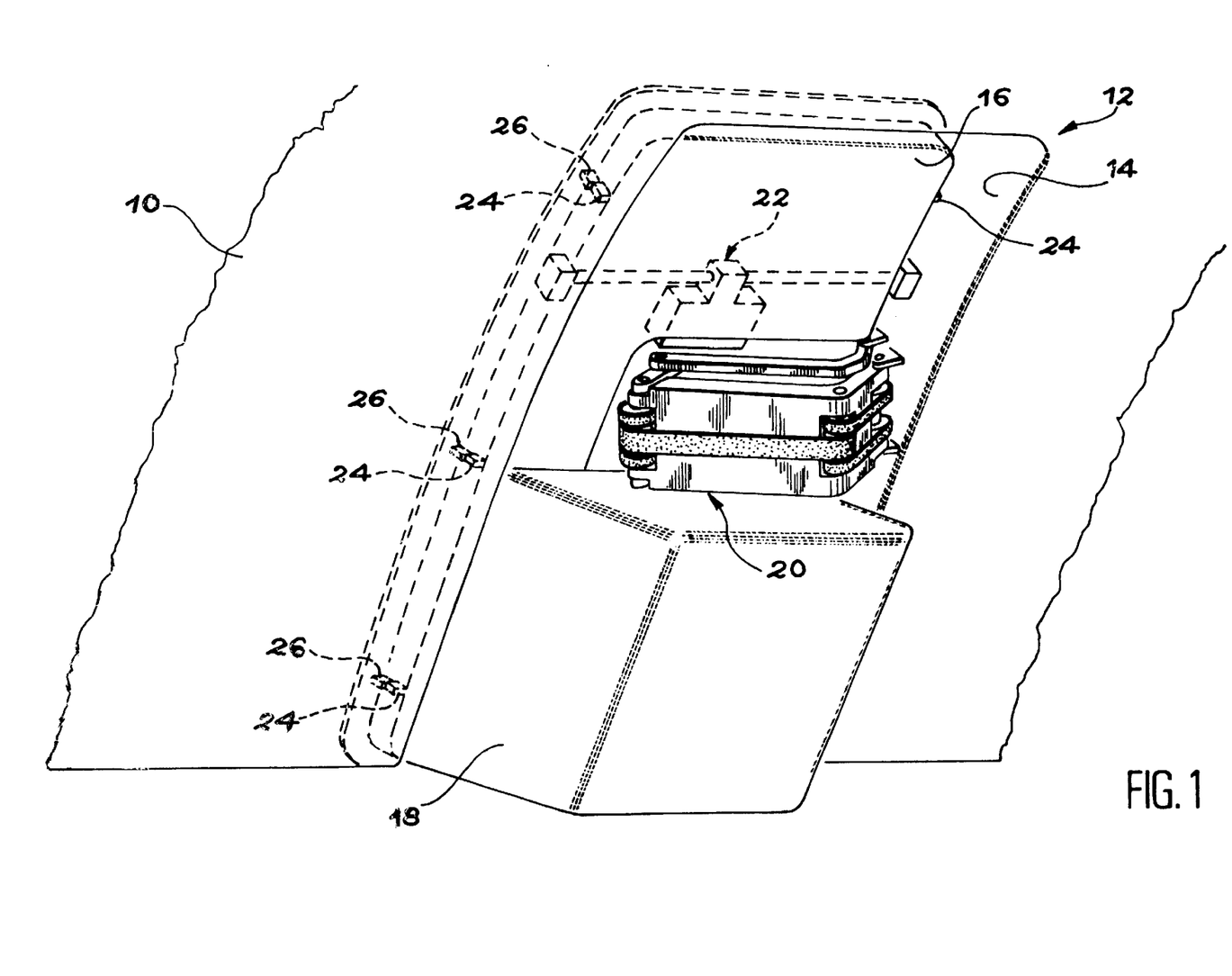
FIG. 1 is a perspective view that very diagrammatically shows an aircraft door in its closed state, observed from inside the cabin.
Figure 2:
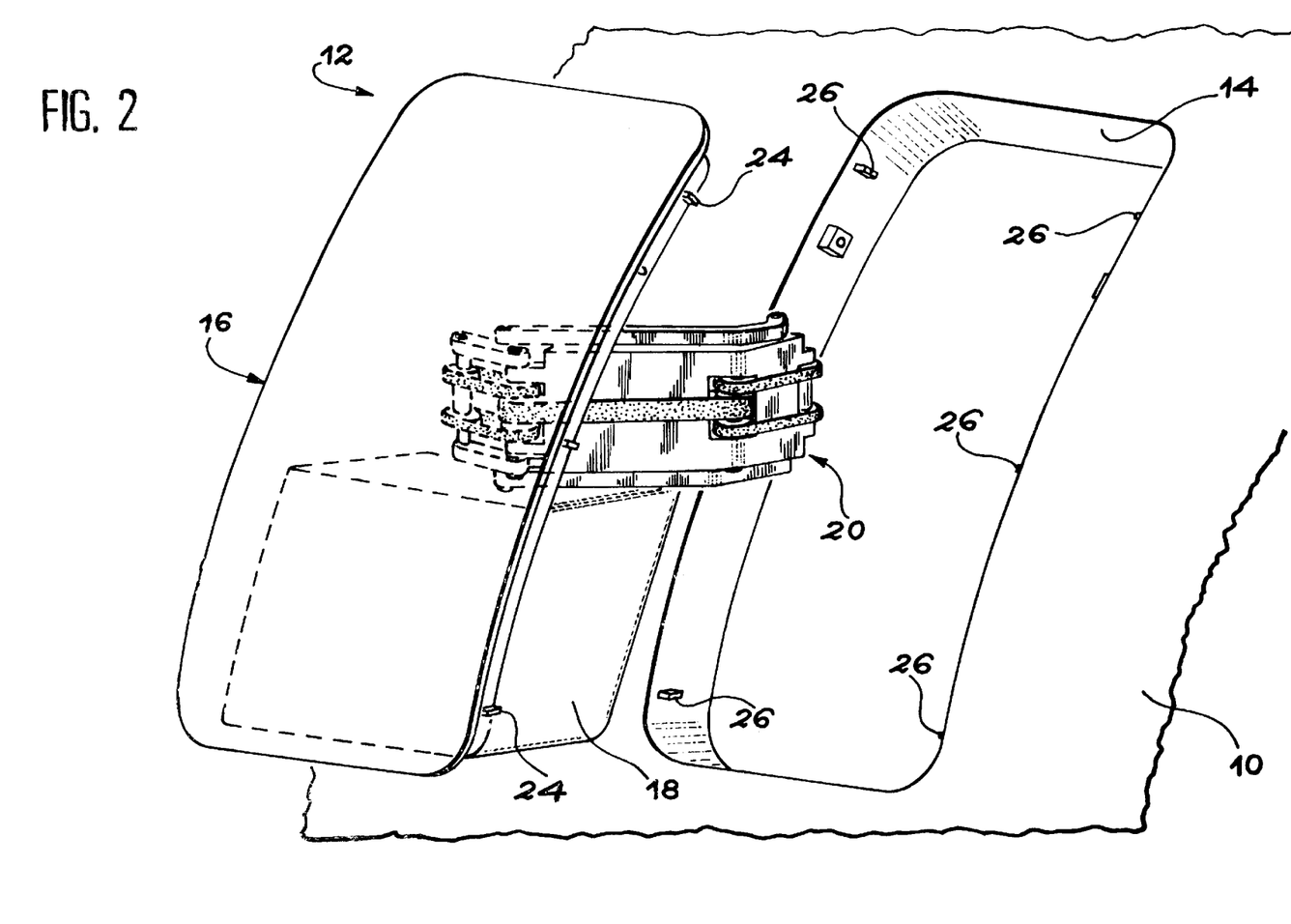
FIG. 2 is a perspective view that shows the door in FIG. 1 in its fully open state observed from outside the aircraft.

FIGS. 1 and 2 show reference 10 that denotes the fuselage of an aircraft. More precisely, the part of the fuselage 10 illustrated in FIGS. 1 and 2 includes a door 12 through which passengers can enter the cabin.

Conventionally, the door 12 comprises a jamb 14 fixed to the fuselage 10 and delimiting an approximately rectangular opening on the inside. When the door 12 is closed, this opening is closed off by a panel 16 of the door 12.

The panel 16 of the door 12 comprises a compartment 18 that projects inwards into the cabin, on the face towards the inside of the aircraft and near the bottom. This compartment 18 contains an emergency exit chute for the aircraft. The invention is particularly suitable for the case in which the compartment 18 is very voluminous to that it can contain a very large chute, although it is not limited to this case.

As illustrated in FIGS. 1 and 2, the panel 16 of the door 12 is connected to one of the uprights of the jamb 14 through an articulation device 20, the innovative design of which will be described in detail later. The main function of the articulation device 20 is to define the trajectory followed by the panel 16 outside the aircraft, when the door 12 is opened and closed. Another function of the articulation device 20 is to keep the orientation of the panel 16 approximately constant when it is moved along the above mentioned trajectory. In other words, the displacement of the panel 16 along this trajectory is such that it always remains parallel to itself and to the part of the fuselage 10 adjacent to the door 12.

Conventionally, the door 12 is also fitted with locking means globally denoted as reference 22 in FIG. 1. These locking means 22 control locking and unlocking of the panel 16 with respect to the jamb 14 when the door is in the closed position. They are outside the scope of the invention and can be made in any manner using techniques well known to an expert in the subject. This presentation does not give a detailed description of them.

Finally, the panel 16 and the jamb 14 of the door 12 are equipped with complementary stops marked with references 24 (FIG. 1) and 26 (FIG. 2) respectively. The stops 26 are normally placed along the approximately vertical uprights of the door jamb 14. When the door is closed as illustrated in FIG. 1, the stops 24 fitted on the panel 16 are placed facing the stops 26 that equip the jamb 14 and are kept in contact with them under the effect of the pressure inside the cabin. In other words, the stops 24 of the panel 16 are offset inwards into the aircraft with respect to the stops 26 of the jamb 14 and are forced into contact with them by the pressure inside the cabin.

The locking means 22 are designed to control upwards and downwards displacements of the panel 16 parallel to the panel 16 during door locking and unlocking operations, respectively. The upwards movement of the panel 16 brings the stops 24 facing the stops 26 when the door is locked. Conversely, the downwards movement of the panel 16 offsets the stops 24 with respect to the stops 26 when the door is released. This movement of the panel 16 precedes opening of the door along the trajectory defined by the articulation device 20.

Figure 3:
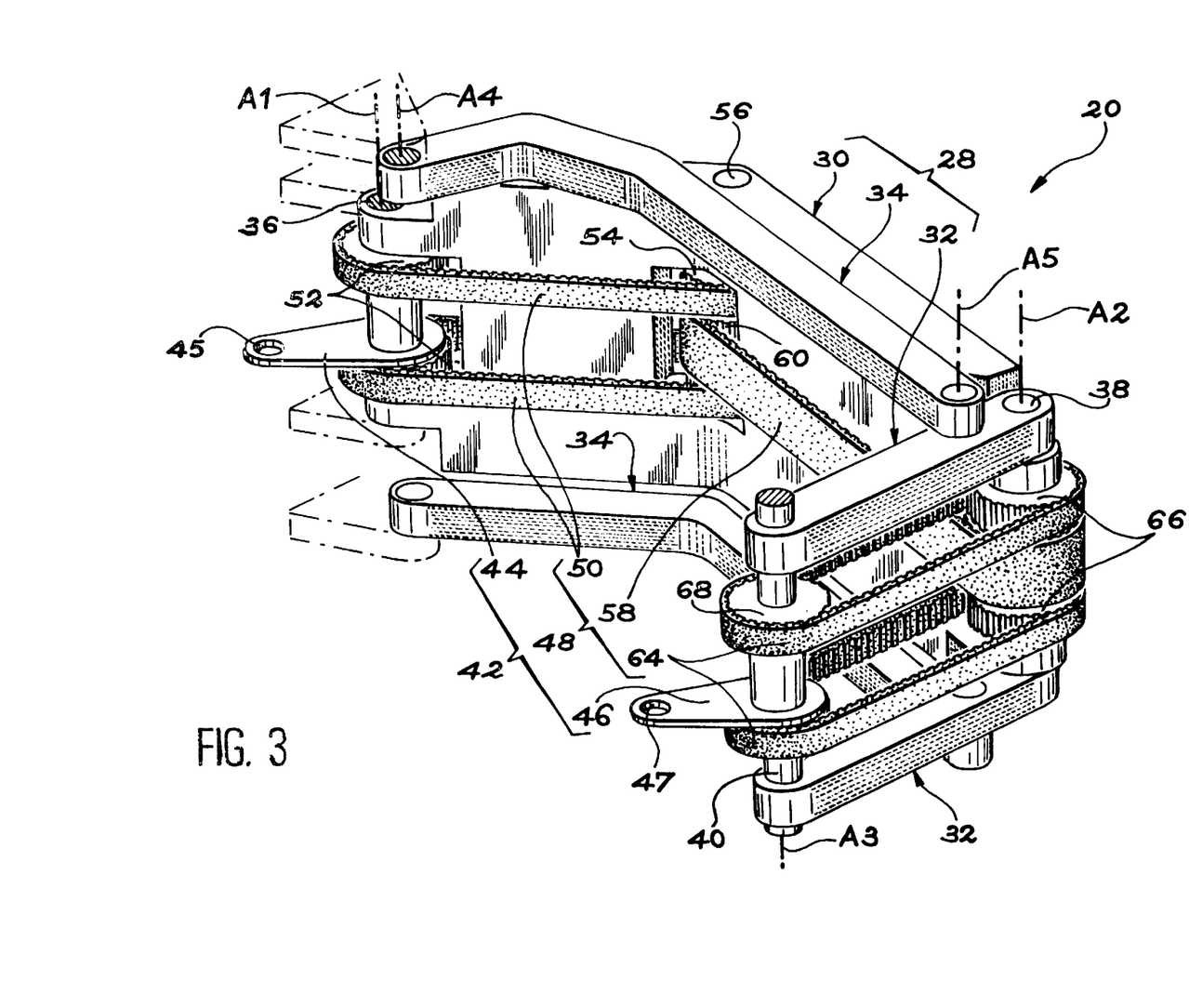
FIG. 3 is a perspective view that shows the articulation device of the door panel according to a preferred embodiment of the invention, at a larger scale.

We will now describe the articulation device 20 according to the invention in detail, particularly with reference to FIG. 3.

The articulation device 20 according to the invention comprises mainly a mechanism 28 forming the link between the jamb 14 and the panel 16 of the door, in order to define a displacement trajectory of the panel 16 located in an approximately horizontal plane with a variable curvature. More precisely, this trajectory comprises mainly a first part with a relatively large radius of curvature and a second part with a relatively small radius of curvature compared with the radius of curvature of the first part. The first part of the trajectory is approximately perpendicular to the door panel 16 and includes the closed state of the said panel. The second part of the trajectory is approximately parallel to the panel and includes the fully open state of the panel. With this arrangement, the compartment 18 in which the chute is located can move into and out of the aircraft cabin without any risk of interference with the jamb 14 of the door.

In other words, the connecting mechanism 28 is designed to generate an approximately elliptical trajectory in which the major axis is approximately horizontal and is perpendicular to the door panel 16.

As illustrated more precisely in FIG. 3, the mechanism 28 in the preferred embodiment of the invention comprises a main arm 30, two secondary arms 32 and two control levers 34.

The main arm 30 is cranked towards the inside of the aircraft. The main arm 30 is a solid part fixed approximately horizontally. One of its ends is articulated onto one of the uprights of the jamb 14, so that it can pivot about a first approximately vertical axis A1. This first axis A1 is materialized by a hinge pin 36.

The two secondary arms 32 are straight and approximately horizontal. They both have the same length and are shorter than the main arm 30. The secondary arms 32 are articulated at one of their ends to the opposite end of the main arm 30, about a second axis A2 parallel to the first axis A1. This second axis A2 is materialized by a hinge pin 38.

The opposite ends of the secondary arms 32 are articulated on the panel 16 of the door by a third axis A3 parallel to axes A1 and A2. This third axis A3 is materialized by a hinge pin 40.

The control levers 34 are arranged approximately horizontally above and below the main arm 30 and their shape is approximately cranked so that it does not interfere with the jamb in the open position. The length of the levers 34 is slightly less than the length of the main arm 30. A first end of the control levers 34 is articulated on the upright of the jamb 14 supporting the main arm 30 at a fourth axis A4 located close to the first articulation axis A1 of the main arm 30 on the same upright. More precisely, the fourth axis A4 is offset towards the outside of the aircraft from the first axis A1.

The opposite end of each of the control levers 34 is articulated on one of the secondary arms 32 by a fifth axis A5 located close to the second articulation axis A2 of the secondary arms 32 on the main arm 30. More precisely, the arrangement is such that the fifth axis A5 is offset both towards the outside of the aircraft and towards the first axis A1 with respect to the second axis A2 regardless of the state of the door 12. Furthermore, the offsets between axes A1 and A4 and between axes A2 and A5 are approximately equal and approximately correspond to the difference in length between the main arm 20 and the control levers 34.

The articulation device 20 according to the invention also comprises orientation means 42 that are associated with the mechanism 28 in order to keep the orientation of the panel 16 approximately constant when it moves between its closed state and its fully open state.

In the embodiment illustrated in FIG. 3, the orientation means 42 comprise a first connecting rod 44 fixed to the hinge pin 36, a second connecting rod 46 fixed to the hinge pin 40, and synchronous connecting means 48 inserted between hinge pins 36 and 40.

More precisely, the end of the first connecting rod 44 opposite the first hinge pin 36 is connected to the corresponding upright of the jamb 14 of the door by a vertical rod (not shown) that fits into a circular hole 45 formed in the connecting rod 44. Similarly, the end of the second connecting rod 46 opposite the hinge pin 40 is connected to the door panel 16 by a vertical rod (not shown) that fits into a circular hole 47 formed in the connecting rod 46.

Furthermore, the synchronous connecting means 48 connect hinge pins 36 and 40 such that the spatial orientation of the second connecting rod 46 remains constant regardless of the position of the mechanism 28. In other words, the second connecting rod 46 is permanently parallel to the first connecting rod 44, which is itself fixed since its two ends are connected in rotation to the upright of the jamb 14. Consequently, the panel 16 of the door moves parallel to itself and to the adjacent part of the aircraft fuselage 10.

In the embodiment shown in FIG. 3, the synchronous connecting means 48 comprise two notched endless belts 50 that pass between toothed wheels 52 and 54 fixed to hinge pin 36 and to hinge pin 56 respectively installed free to rotate in the cranked part of the main arm 30 parallel to axes A1 to A5. The synchronous connecting means 48 also comprise a notched endless belt 58 that passes between a toothed wheel 60 and a toothed wheel (not shown) fixed to hinge pin 56 and to hinge pin 38 respectively, and two notched endless belts 64 that pass between toothed wheels 66 and 68 fixed to hinge pins 38 and 40 respectively.

Figure 4A:
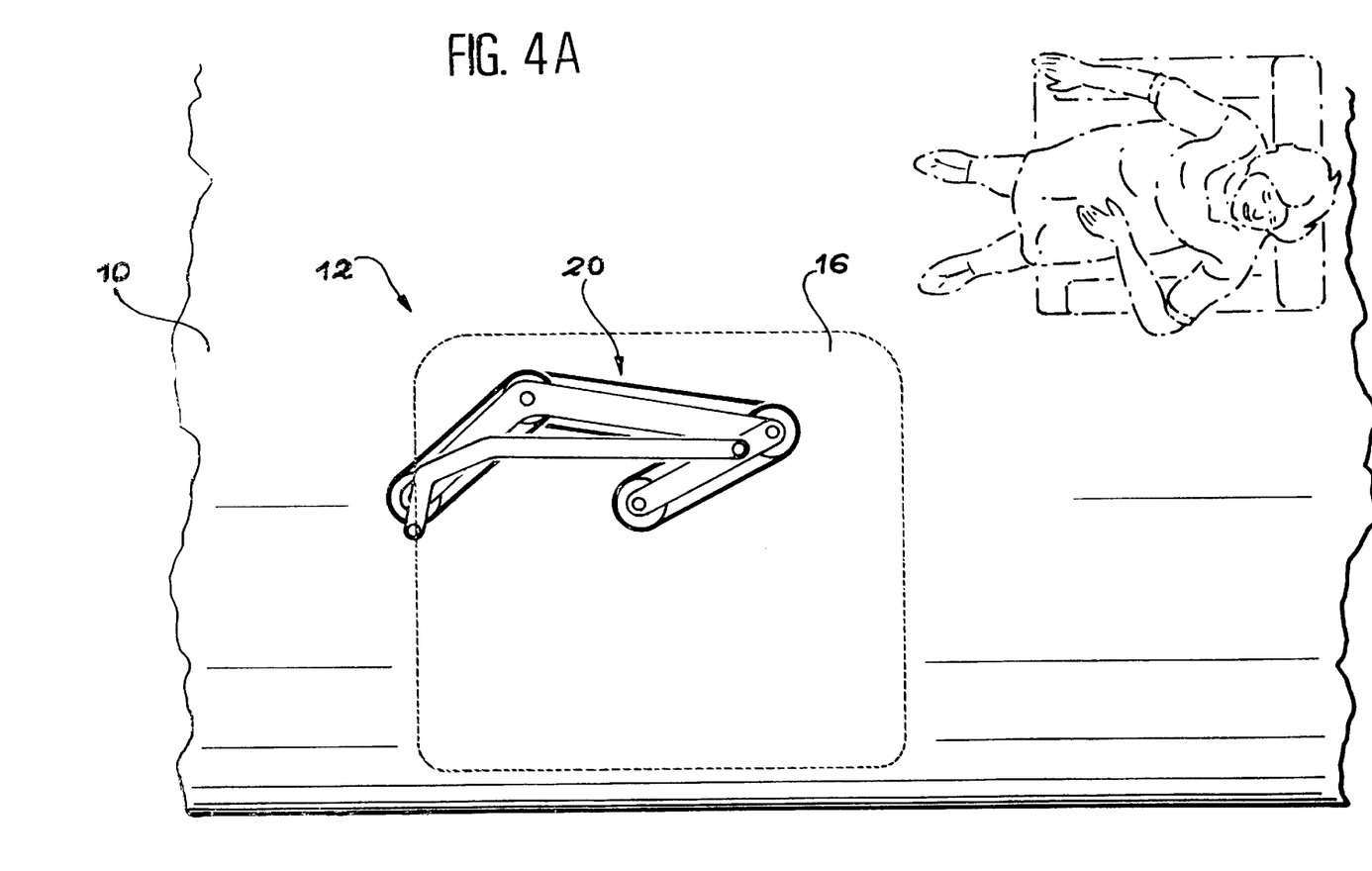
FIGS. 4A to 4C are top views diagrammatically illustrating different relative positions of the door panel obtained using the articulation device in FIG. 3.
Figure 4B:
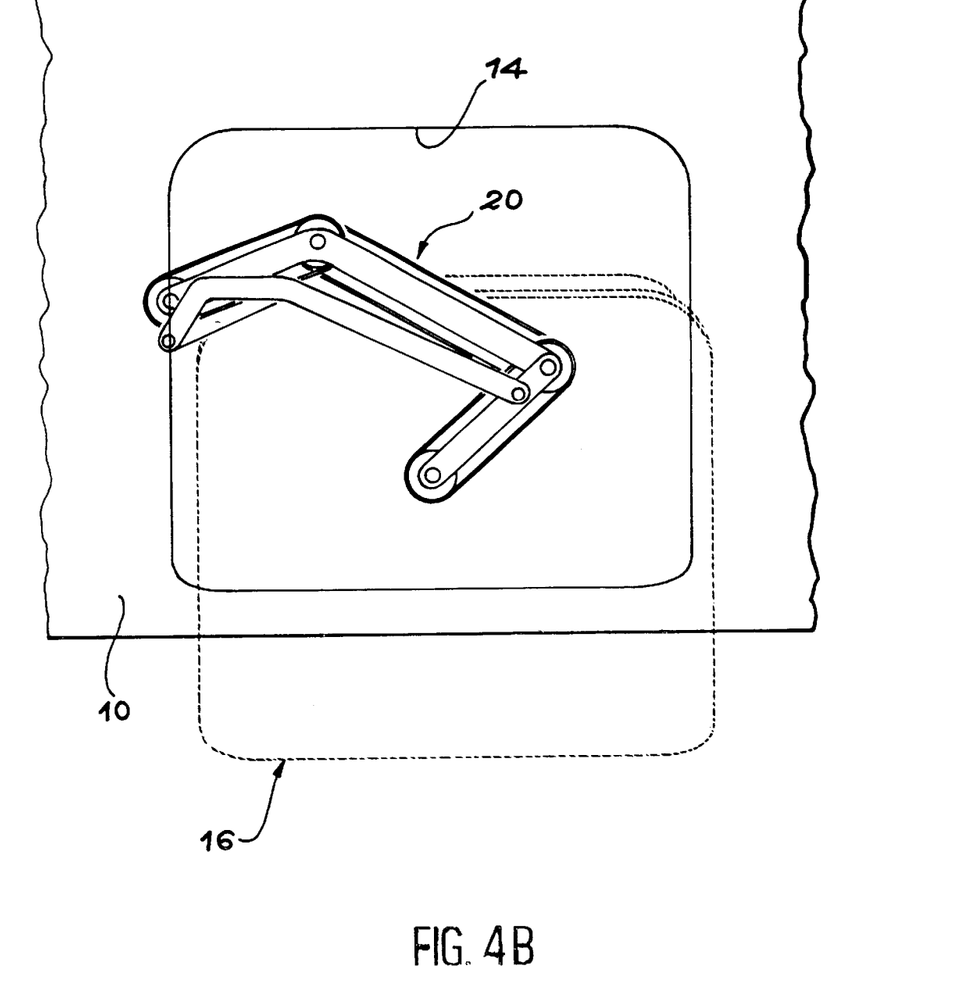
Figure 4C:
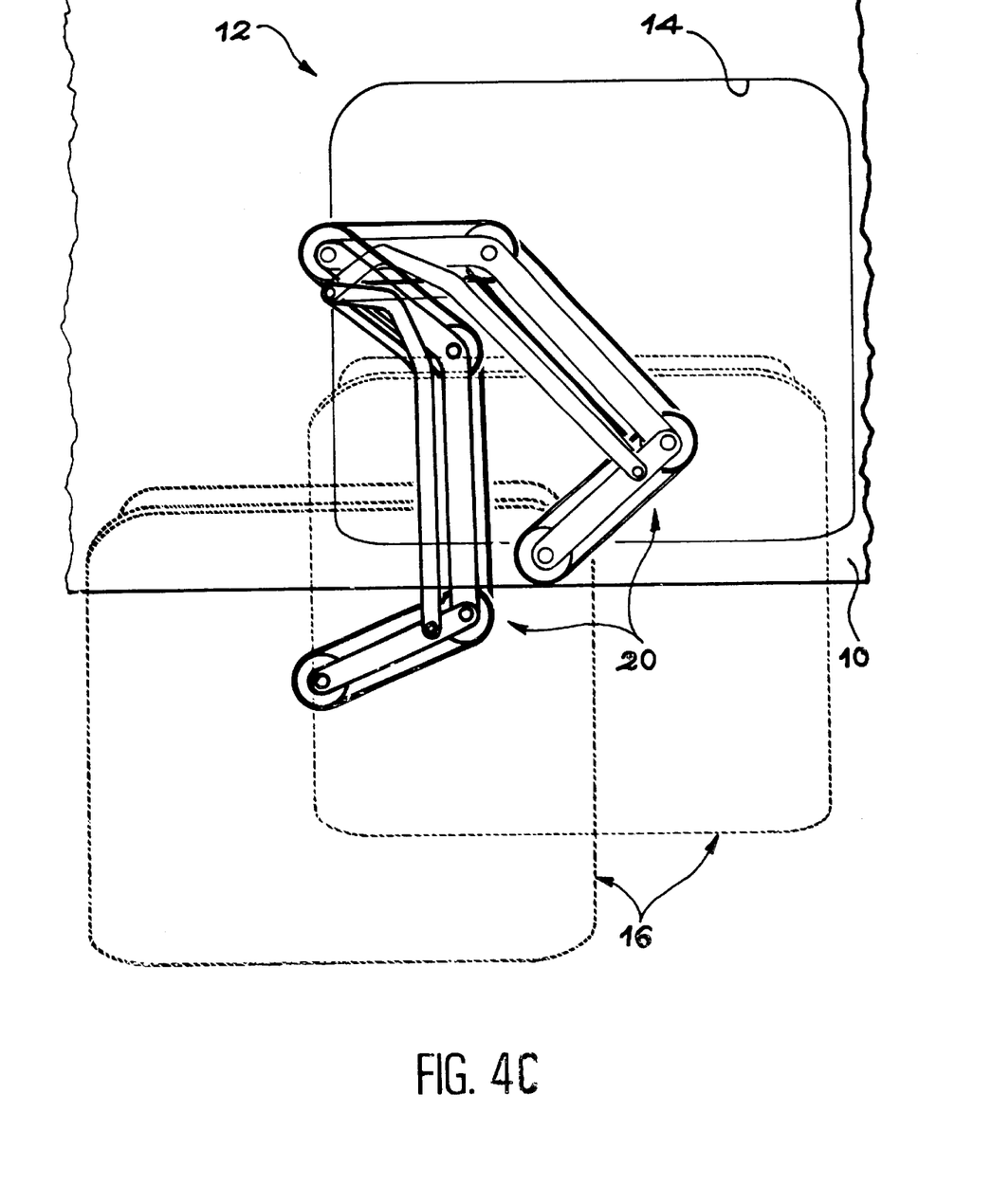

In the embodiment of the invention that has just been described with reference to FIG. 3, the mechanism 28 moves the door panel 16 along an approximately elliptical trajectory, the various positions of the trajectory being illustrated diagrammatically in FIGS. 4A to 4C, when the panel 16 is moved from its closed state to its fully open state, and vice versa. More precisely, the major axis of the ellipse formed by this trajectory is approximately perpendicular to the door panel 16. Consequently, the first part of the trajectory including the closed state of the panel 16 illustrated in FIG. 4A has a large radius of curvature and is approximately perpendicular to this panel (see also the position illustrated in FIG. 4B and the position shown at the right in FIG. 4C). This enables the compartment 18 in which the chute is housed to pass beyond the door sill without any risk of interfering with the jamb 14, even when the compartment is very large.

The second part of the trajectory followed by the panel 16 has a smaller radius of curvature and is approximately parallel to the panel. It includes the fully open position of the door and the position shown at the left in FIG. 4C. In this part of the trajectory, the panel 16 of the door moves forwards or backwards quickly to completely release the opening delimited by the jamb 14, so that passengers can enter and leave the cabin.

Figure 5:
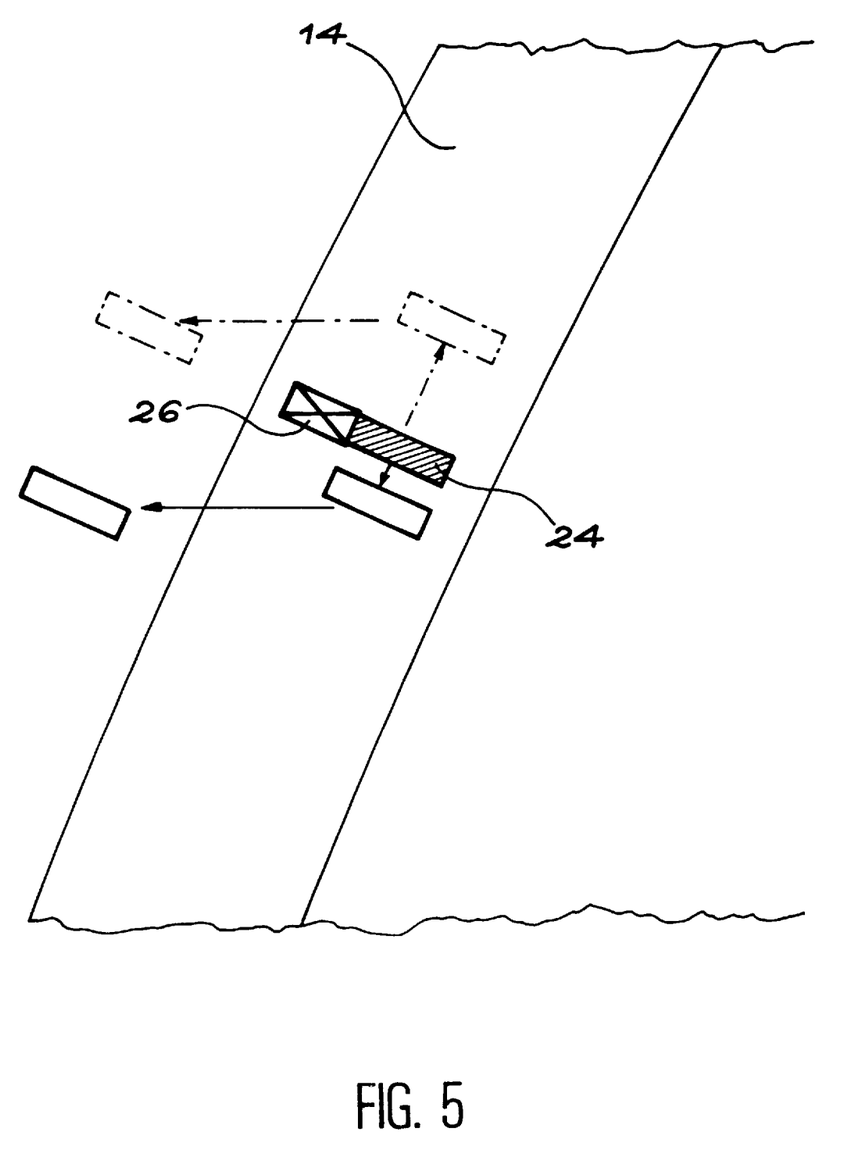
FIG. 5 diagrammatically illustrates the downwards movement of the door panel controlled by locking means when they are released before the panel is opened.

According to one advantageous improvement of the invention illustrated in FIG. 5, that is particularly applicable to the case in which the door 12 is located in the upper part of the fuselage 10 such that its upper part is strongly inclined towards the inside of the aircraft, the locking means 22 of the door are laid out such that when they are activated in the release direction, the panel 16 moves downwards with respect to the jamb 14 by a limited distance. This downwards movement may be made over a distance of about 25 mm. Obviously, the locking means 22 control a reverse movement of the panel 16, in other words an upwards movement, when they are activated to lock the door.

This special arrangement very significantly reduces the travel distance of the door panel 16 necessary to separate the stops 24 fitted on this panel from the stops 26 fitted on the jamb 14, before the door can be opened. Due to the inclination of the stops 24 and 26 resulting from the curvature of the fuselage 10 at this level, a conventional upwards movement of the panel 16 before the door is opened would necessitate a displacement of the said panel by about twice as much, as shown diagrammatically in chained dotted lines in FIG. 4.

Note that the articulation device 20 is designed to take account of downwards and upwards movements of the panel 16 that take place when the door is unlocked or locked. Thus, simply as an example, the hinge pin 40 and the rod (not shown) passing through the hole 47 may be connected to the door panel 16 by a sliding and ball joint mechanism enabling the relative displacement mentioned above between the panel 16 and the jamb 14.

Obviously, the invention is not restricted to the embodiment that was described above as an example. Thus, it will be understood that the synchronous connecting means with notched belts and toothed wheels described above can be replaced by any equivalent mechanism such as chain and toothed wheel systems or cable and pulley systems or a linkage of connecting rods and levers. Similarly, the mechanism used to define the trajectory followed by the door panel may consist of any mechanism capable of defining an approximately elliptical trajectory.

What is claimed is:

1. Articulation device for a panel of an aircraft door on a jamb of the said door, the said device comprising a mechanism connecting the jamb to the panel, to define a trajectory followed by the said panel, outside the aircraft, when the panel is opened and closed, and orientation means capable of maintaining an approximately constant orientation of the panel when it is displaced along the said trajectory, in which the said mechanism defines a trajectory with a variable curvature comprising mainly a first part with a relatively large radius of curvature, said first part of the trajectory being approximately perpendicular to the panel, including a closed state of the said panel, and a second part of the trajectory with a relatively small radius of curvature, said second part being approximately parallel to the said panel and including a fully open state of the panel; in which the said mechanism comprises a main arm that can be articulated on the jamb by a first axis, at least one secondary arm articulated on the main arm by a second axis and that can be articulated on the panel by a third axis, and at least one control lever that can be articulated on the jamb by a fourth axis located close to the first axis and articulated on the secondary arm by a fifth axis located close to the second axis; and, in which the fourth axis is offset towards the outside of the aircraft with respect to the first axis and the fourth axis is offset towards the outside of the aircraft and towards the first axis with respect to the second axis.

2. Device according to claim 1, in which the said mechanism defines an approximately elliptical trajectory, a major axis of the trajectory being approximately perpendicular to the panel.

3. Device according to claim 1, in which the offsets between the first and the fourth axes and between the second and fifth axes are approximately equal.

4. Device according to claim 3, in which the length of the control lever is less than the length of the main arm by a value approximately equal to the offsets between the first and fourth axes and between the second and fifth axes.

5. Aircraft door comprising a jamb connected to the fuselage of the aircraft and a panel articulated on the jamb by an articulation device according to claim 1.

6. Aircraft door according to claim 5, in which the panel and the jamb comprise complementary stops that come into mutual contact when the panel is in its closed state, the said door comprising locking means that control the downwards movement of the panel in order to offset the stops on the panel downwards with respect to the stops on the jamb when the locking means are released, before the panel is opened along the said trajectory, and vice versa.

7. Articulation device for a panel of an aircraft door on a jamb of the said door, the said device comprising a mechanism connecting the jamb to the panel, to define a trajectory followed by the said panel, outside the aircraft, when the panel is opened and closed, and orientation means capable of maintaining an approximately constant orientation of the panel when it is displaced along the said trajectory, in which the said mechanism defines a trajectory with a variable curvature comprising mainly a first part with a relatively large radius of curvature, said first part of the trajectory being approximately perpendicular to the panel, including a closed state of the said panel, and a second part of the trajectory with a relatively small radius of curvature, said second part being approximately parallel to the said panel and including a fully open state of the panel; in which the said mechanism comprises a main arm that can be articulated on the jamb by a first axis, at least one secondary arm articulated on the main arm by a second axis and that can be articulated on the panel by a third axis, and at least one control lever that can be articulated on the jamb by a fourth axis located close to the first axis and articulated on the secondary arm by a fifth axis located close to the second axis; and, in which the orientation means comprise at least one first connecting rod the end of which is fixed to a first hinge pin supporting the main arm about the first axis, and the other end of which can be articulated on the jamb, at least one second connecting rod, one end of which is fixed to a second hinge pin installed free to rotate on the secondary arm about the third axis and the other end of which can be articulated on the panel, and synchronous connecting means inserted between the first hinge pin and the second hinge pin to keep the angular orientation of the second hinge pin constant.

8. Device according to claim 7, in which the synchronous connecting means comprise at least one first endless belt supported by the main arm and passing between pulleys fixed in rotation to the first hinge pin and to a third hinge pin free to rotate about the second axis respectively, and at least a second endless belt supported by the secondary arm and passing between pulleys fixed in rotation to the third hinge pin and the second hinge pin, respectively.

9. Device according to claim 8, in which the main arm is cranked towards the inside of the aircraft and supports a fourth hinge pin rotating in its cranked part, at least two first endless belts passing between the pulleys supported by the first and the fourth hinge pins respectively, and between the pulleys supported by the fourth and and third hinge pins respectively.

10. Device according to claim 7, in which the said mechanism defines an approximately elliptical trajectory, a major axis of said trajectory being approximately perpendicular to the panel.

11. Aircraft door comprising a jamb connected to the fuselage of the aircraft and a panel articulated on the jamb by an articulation device according to claim 7.

* * * * *